United States Patent
Levinsky et al.

(10) Patent No.: US 8,065,485 B2
(45) Date of Patent: Nov. 22, 2011

(54) METHOD AND APPARATUS FOR DETERMINING CACHE STORAGE LOCATIONS BASED ON LATENCY REQUIREMENTS

(75) Inventors: Gideon N. Levinsky, Austin, TX (US);
Paul Caprioli, Santa Clara, CA (US);
Sherman H. Yip, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 372 days.

(21) Appl. No.: 12/470,639

(22) Filed: May 22, 2009

(65) Prior Publication Data
US 2010/0299482 A1    Nov. 25, 2010

(51) Int. Cl.
G06F 12/00 (2006.01)
G06F 9/26 (2006.01)

(52) U.S. Cl. ........ 711/118; 711/119; 711/120; 711/121; 711/122; 711/128; 711/129; 711/137; 711/204; 711/205

(58) Field of Classification Search .................. 711/118, 711/119, 120, 121, 122, 128, 129, 137, 204, 711/205
See application file for complete search history.

(56) References Cited

U.S. PATENT DOCUMENTS

| | | | |
|---|---|---|---|
| 4,357,656 A | 11/1982 | Saltz et al. | |
| 4,737,909 A | 4/1988 | Harada | |
| 5,752,069 A * | 5/1998 | Roberts et al. | 711/128 |
| 5,835,951 A * | 11/1998 | McMahan | 711/128 |
| 5,848,433 A * | 12/1998 | Tran et al. | 711/118 |
| 5,860,104 A | 1/1999 | Witt et al. | |
| 6,105,111 A * | 8/2000 | Hammarlund et al. | 711/128 |
| 6,115,792 A * | 9/2000 | Tran | 711/128 |
| 6,138,225 A * | 10/2000 | Upton et al. | 711/128 |
| 6,157,986 A * | 12/2000 | Witt | 711/118 |
| 6,370,622 B1 * | 4/2002 | Chiou et al. | 711/128 |
| 6,418,525 B1 * | 7/2002 | Charney et al. | 711/128 |
| 6,681,295 B1 * | 1/2004 | Root et al. | 711/128 |
| 7,093,075 B2 * | 8/2006 | Reohr et al. | 711/128 |
| 7,581,064 B1 * | 8/2009 | Zedlewski et al. | 711/118 |
| 7,890,700 B2 * | 2/2011 | Choy et al. | 711/122 |

* cited by examiner

*Primary Examiner* — Trong Phan
(74) *Attorney, Agent, or Firm* — Meyertons, Hood, Kivlin, Kowert & Goetzel, P.C.; Erik A. Heter (57) ABSTRACT

A method for determining whether to store binary information in a fast way or a slow way of a cache is disclosed. The method includes receiving a block of binary information to be stored in a cache memory having a plurality of ways. The plurality of ways includes a first subset of ways and a second subset of ways, wherein a cache access by a first execution core from one of the first subset of ways has a lower latency time than a cache access from one of the second subset of ways. The method further includes determining, based on a predetermined access latency and one or more parameters associated with the block of binary information, whether to store the block of binary information into one of the first set of ways or one of the second set of ways.

20 Claims, 7 Drawing Sheets

| Block Address | Most Recent Access | Last Update | # Accesses since Last Update | Addr. Translaton in TLB? | Stored In Higher Level Cache? |
|---|---|---|---|---|---|
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |

METHOD AND APPARATUS FOR DETERMINING CACHE STORAGE LOCATIONS BASED ON LATENCY REQUIREMENTS

BACKGROUND OF THE INVENTION

1. Field of the Invention

This invention relates to memory used in computers and other digital systems, and more particularly, to cache memories.

2. Description of the Related Art

Many computers and other digital systems utilize a memory hierarchy in which information (e.g., data, instructions, etc) is stored. Such a memory hierarchy may extend from small, fast memory (e.g., registers), through larger but somewhat slower memory (e.g., random access memory, or RAM), to large and slow memory (e.g., hard disk storage). Using various types of memory in such a hierarchy can allow information to be stored in an appropriate location. For example, registers may be used to store operands and/or results of instructions close to execution time, cache memory may be used to store instructions and/or data that are frequently accessed, RAM may be used to store data and instructions for software programs that are currently active on a computer system, and hard disk storage may be used to store programs and data that are not in use.

In addition to the various levels of memory hierarchy, additional sub-levels may also be present in some systems. For example, a computer system may employ multiple levels of cache memory. A first level cache (L1, or level one cache) may be a memory that is just below a register set in a memory hierarchy. Additional cache levels (e.g. L2, L3 and so forth) may also be present. In some processors, an L0 cache may also be present in the hierarchy between the L1 cache and the registers, wherein the L0 cache is a very small but very fast cache. In general, for a given cache, the average latency of accesses is the same, with the higher level caches having a faster average latency than the lower level caches. For example, the L1 cache may have a first average latency, while the lower level L2 cache may have a second average latency that is slower than that of the L1 cache.

The use of cache memories to store frequently accessed information may improve the performance of a computer system, since accesses to a cache memory may be performed with a latency that is significantly lower than accesses to main memory. Accordingly, larger caches may be implemented in computer systems (including those implemented as part of a processor). However, larger cache memories may consume more circuit area (e.g., such as area on a processor die) that may be needed by other circuits, and may also sacrifice some operating speed, since the latency for accesses to larger memories may be greater than that for smaller memories.

SUMMARY OF THE INVENTION

A method for determining whether to store binary information in a fast way or a slow way of a cache is disclosed. In one embodiment, the method includes receiving a block of binary information to be stored in a cache memory having a plurality of ways. The plurality of ways includes a first subset of ways and a second subset of ways, wherein a cache access by a first execution core from one of the first subset of ways has a lower latency time than a cache access from one of the second subset of ways. The method further includes determining, based on a predetermined access latency and one or more parameters associated with the block of binary information, whether to store the block of binary information into one of the first set of ways or one of the second set of ways. After determining where to store the block of binary information, the method further includes storing the block of binary information into one of the first set of ways or one of the second set of ways based on the results of the determination.

A processor is also disclosed. In one embodiment, the processor includes a first execution core and a cache memory having a plurality of ways, wherein the plurality of ways includes a first subset of ways and a second subset of ways, wherein a cache access by the first execution core from one of the first subset of ways has a lower latency time than a cache access from one of the second subset of ways. The processor further includes a decision unit configured to, for a given block of binary information to be stored in the cache, determine whether the block of binary information is to be stored in a way of the first subset or a way of the second subset based on a predetermined access latency and one or more parameters associated with the block of binary information.

In some embodiments, updating a division in a cache between slow ways and fast ways may be possible. Accordingly, a method for updating is disclosed. In one embodiment, the method includes determining a target latency for accesses to a cache memory, the cache memory having a plurality of ways. After the target latency has been determined, the method further includes determining a first set of ways, wherein latency for accesses from one of the first set of ways is less than or equal to the target latency and determining a second set of ways, wherein latency for accesses from one of the second set of ways is greater than the target latency. The method further includes designating the first set of ways as fast ways and designating the second set of ways as slow ways. For subsequent writes to the cache memory, the method includes determining whether a block of binary information is to be stored in one of the fast ways or one of the slow ways based on one or more parameters associated with the block of binary information.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 1:
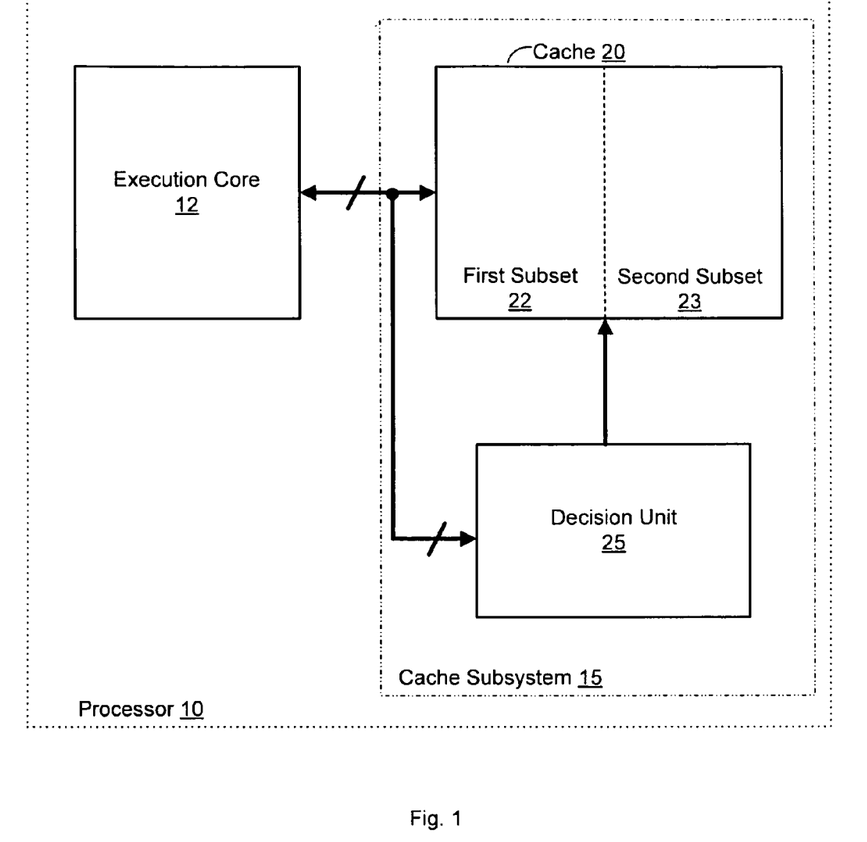
FIG. 1 is a block diagram of one embodiment of a processor including an execution core and a cache subsystem.

Turning now to FIG. 1, a block diagram of one embodiment of a processor including an execution core and a cache subsystem is shown. In the embodiment shown, processor 10 includes an execution core 12 configured to execute instruction in the operation of a computer system in which processor 10 is implemented. Execution core 12 may include one or more execution units, such as one or more fixed point execution units, one or more floating point execution units, and one or more integer execution units. The specific type and number of execution units in execution core 12 may vary from one embodiment to the next. Execution core 12 may also include other circuitry, including register files, shifters, arithmetic circuits, and any other type of circuit that may be associated with an execution core. Furthermore, execution core 12 may be configured to support various techniques such as pipelining, branch prediction, speculative execution, and so forth.

Execution core 12 in this embodiment is coupled to cache subsystem 15 including a cache 20. Cache 20 may be an instruction cache, a data cache, or a unified cache that is configured to store both instructions and data. Moreover, cache 20 may be an L1 (level one) cache. It should be noted, however, that the methods that will be discussed herein may be applied to caches at any level (e.g., to an L2 cache, and L3 cache, etc.). In the embodiment shown, cache 20 is divided into a first subset of ways 22 and a second subset of ways 23. The first subset of ways 22 may be considered to be "fast ways," that is, ways in which accesses thereto meet a certain latency requirement. The second subset of ways may be considered to be "slow ways," or ways for which accesses thereto do not meet the target latency requirement. Blocks of binary information may be stored in one of the fast ways or slow ways depending upon a predetermined access latency and one or more parameters associated with the block. In general, cache subsystem 15 may be configured such that more important (e.g., more frequently accessed) blocks of binary information are stored in one of the fast ways, while less important (e.g., less frequently accessed) blocks of binary information may be stored in one of the slow ways.

As previously noted, cache 20 may be a data cache, an instruction cache, or a unified cache configured to store both data and instructions. Accordingly, the blocks of binary information stored therein may be data or instructions. However, as used herein, the term "blocks of binary information" is not limited to data and/or instructions, and may include any type of binary information. For example, as will be discussed in further detail below, the methods discussed herein may be applied to a translation lookaside buffer (TLB), with blocks of binary information providing address translation information (e.g., logical-to-physical address translations).

Generally speaking, cache latencies may be a critical factor in determining processor performance. Cache latency may depend at least in part on the size of a cache, wherein the average latency of cache accesses may increase as cache size increases. However, processor performance may also depend somewhat on the size of one or more of the caches implemented therein. Often times, it is desirable to implement a larger cache at one or more of the cache levels present. Implementing a cache with a larger number of ways may minimize conflict misses. A larger cache in general may minimize capacity misses. Moreover, minimizing the number of misses may in turn minimize the performance penalty that accrues due to the miss penalty that occurs for each cache miss.

Accordingly, subdividing a given cache into a number of slow ways and number of fast ways may enable the implementation of a larger cache while also keeping the latency of cache accesses within acceptable limits.

Furthermore, storing higher priority (e.g., more frequently accessed) blocks of binary information in the fast ways may reduce the average latency for all accesses to a particular cache. Consider a cache wherein the latency the fastest way is X number of processor cycles (e.g., wherein each processor cycle may include one or more clock cycles), while the latency of the slowest ways is X+1 cycles. Accordingly, the average latency for such a cache may be X+0.5 cycles if the blocks of binary information stored therein are randomly allocated to any of the various ways (in a fully associative cache) or randomly allocated to any way within a particular set (for a set associative cache). However, if the blocks having the highest priority (e.g., those that are most frequently accessed) are stored in the fastest ways of the cache, the average latency may be reduced to a value that is closer to X cycles and less than X+0.5 cycles.

For a typical direct mapped cache, blocks may be stored certain ways in the cache. For a typical set associative cache, blocks may be stored in any way within a given set of ways. For a typical fully associative cache, blocks may be stored to any location. However, for various embodiments of cache subsystem 15 as discussed herein, blocks may be allocated for storage to one of a number of different ways based on latency considerations. More particularly, factors indicating where a given block of binary is to be stored may include, in various embodiments, a target latency and one or more parameters associated with the block. The parameters may include information that may be used to ascertain the criticality of cache access latency for the given block of binary information, wherein higher priority blocks may be stored in fast ways (i.e. ways having a lower latency, or faster access time), while lower priority blocks may be stored in slow ways (i.e. ways having a higher latency, or slower access time).

Cache subsystem 15 in the embodiment shown includes a decision unit 25, which is coupled to cache 20 and execution core 12. Decision unit 25 may be configured to perform a number of different functions, including determining where in cache 20 a particular block of binary information is to be stored, as well as determining which ways belong in the first subset 22 and the second subset 23. When execution core 12 issues a block of binary information to be written to cache 20 (e.g., the result of an executed instruction), decision unit 25 may examine one or more parameters associated with the block of binary information in order to determine whether or not it should be stored in a way of the first subset 22 (e.g., fast ways) or a way of the second subset 23 (e.g., slow ways), and select a storage location based on this determination.

Decision unit 25 may be further configured to monitor history of blocks stored in cache 20, and may cause the migration of blocks between the fast ways and slow ways dependent on this history. For example, consider a situation in which decision unit 25 determines that a first block of binary information stored in one of the fast ways is being accessed less frequently than a second block of binary information stored in one of the slow ways. Based on such a determination, decision unit 25 may swap the storage locations of the respective blocks of binary information, moving the second block of binary information into one of the fast ways while moving the first block of binary information to one of the slow ways.

In addition to the functions discussed above, decision unit 25 may also perform arbitration functions to determine which, if any blocks of binary information are to be purged from the cache when a new block of binary information is to be stored therein. For example, responsive to a request to store a new block of binary information into cache 20, decision unit 25 may determine that another particular block may be purged therefrom, e.g., if that particular block is the least recently accessed block in the cache. After causing the removal of the least recently accessed block from the cache, decision unit 25 may store the new block in its place, or may cause the migration of another block to the recently vacated storage location. For example, if the least recently used block of binary information is purged from one of the slow ways, and decision unit determines that the new block should be stored in one of the fast ways, decision unit 25 may cause the migration of another block from the first subset (e.g., fast ways) to the second subset (e.g., slow ways), while subsequently storing the new block in the recently vacated storage location in the first subset.

Figure 2:
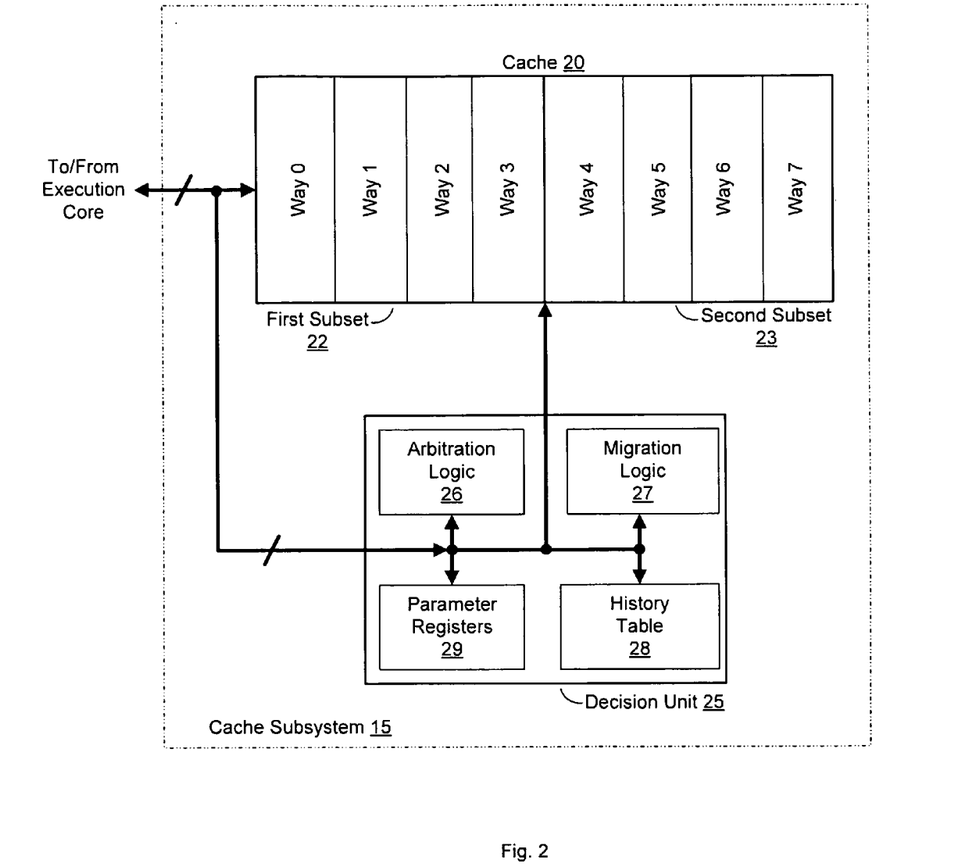
FIG. 2 is a block diagram of one embodiment of a cache subsystem.

FIG. 2 is a block diagram of one embodiment of a cache subsystem. In the embodiment shown, cache subsystem includes cache 20, which includes a plurality of ways (way 0-way 7) that are further divided into a first subset 22 and a second subset 23. In this example, first subset 22 includes way 0-way 3, while second subset 23 includes way 4-way 7. As with FIG. 1, the ways of first subset 22 in this particular example are considered to be the fast ways, while the ways of the second subset 23 are considered to be the slow ways. It should be noted that the arrangement shown in FIG. 2 is just one of many possible arrangements. Cache 20 may include any number of ways, including a greater or lesser number than shown here.

The subdivision between first subset 22 and second subset 23 may vary from one embodiment to another. For example, in one embodiment, first subset 22 (e.g., fast ways) may include way 0-way 2, while second subset 23 (e.g., slow ways) may include way 3-way 7. Moreover, the subdivision between slow ways and fast ways may be changed in a given embodiment. Thus, embodiments so configured may designate first subset 22 to include way 0-way 2 and the second subset 23 to include way 3-way 7 in one instance, and may later designate the first subset 22 to include way 0-way 3 and the second subset 23 to include way 4-way 7 in another instance. In such embodiments, the particular designations between a subset of fast ways and a subset of slow ways may be changed according to a user request, a particular application, a particular thread of execution, and so forth.

Decision unit 25 may be configured to perform the designation of ways between the first subset 22 of fast ways and the second subset 23 of slow ways. In the embodiment shown, decision unit 25 includes a parameter register file 29 and arbitration logic 26. Parameter register file 29 may include one or more registers that store information regarding parameters that may be used to determined whether or not a block of binary information is to be stored in a fast way or a slow way, information regarding which of the ways are designated as fast ways, which ways are designated as slow ways, latency information for each of the ways, target latency information, and so forth.

In one embodiment, responsive to a request received from an execution core, arbitration logic 26 may access information from parameter register file 29 in order to determine which ways should be designated as fast ways and which should be designate as slow ways. The execution core 12 may then perform a number of accesses to cache 29, with at least one access to each way being performed. The latency of these various accesses may then be reported to arbitration logic 26. Arbitration logic 26 may then determine which ways should be designated as fast ways and which ways should be designated as slow ways, based on information such as a target latency value, which may be accessed from parameter register file 29. After making this determination, arbitration logic 26 may write information into one or more registers of parameter register file 29 in order to designate which of the ways is a fast way and which of the ways is a slow way (e.g., which ways are part of first subset 22 and which ways are part of second subset 23).

During normal operation, when a block of binary information is to be written to cache 20, arbitration logic 26 may receive the block, along with information indicative of various parameters associated with the block. Responsive to receiving the block of binary information, arbitration logic 26 may access parameter register file 29 in order to obtain information for determining which subset of ways to which the block should be stored. The determination of whether or not to store a block in a fast way or a slow way may be based on one or more of a number of different parameters. In one embodiment, such a decision may be based on an execution thread with which the block of binary information is associated. If the execution thread has a priority that is higher than other current execution threads, the block of binary information may be stored in one of the fast ways. On the other hand, if the block of binary information is associated with a low priority execution thread, it may be stored in one of the slow ways.

A type of instruction associated with a block of binary information may be another parameter on which is made a decision regarding whether to store the block in fast way or a slow way. In some processor/computer architectures, some instructions may be more latency tolerant than others (i.e. their execution may not be adversely affected by a longer latency). For example, a store instruction in a load/store architecture may have a greater degree of latency tolerance than a number of other instructions, as the store instruction may indicate a write to main memory wherein the latency of such a write may exceed that of any cache access of the same data. Accordingly, a block of binary information associated with a store instruction may be stored in one of the slow ways. On the other hand, a branch instruction that relies on a data value represented by the block of binary information may be stored in a fast way, since a delay otherwise caused by a long latency may delay a determination of whether or not the branch is taken and thus may slow down overall instruction execution.

Other factors that may be used to determine whether or not a block of binary information is stored in a fast way or a slow way include whether or not the block is also stored in a higher level cache, and whether corresponding binary information is stored in another cache (e.g., corresponding address translation information in a TLB, an instruction in an instruction cache corresponding to data in a data cache, and so on). For example, if a certain instruction is stored in a fast way of an instruction cache, a corresponding block of data may be store in a fast way of a data cache. It should be noted however, the embodiments discussed herein are not limited to those parameters that are explicitly disclosed, as other parameters may be used to determine storage locations for blocks of binary information to be stored in a cache. In general, any parameter or related information that may indicate the importance of a given block of binary information, its latency tolerance, or other information, may be stored in parameter register file 29 and used by arbitration logic 26 in order to determine a storage location for the given block.

As noted above, decision unit 25 may be configured to move blocks of binary information stored in cache 20 from one of the fast ways to one of the slow ways, and vice versa. Accordingly, the embodiment of decision unit 25 shown in FIG. 2 includes migration logic 27 and history table 28. History table 28 in the embodiment shown is configured to store various types of historical information regarding blocks stored in cache 20.

Figure 3:
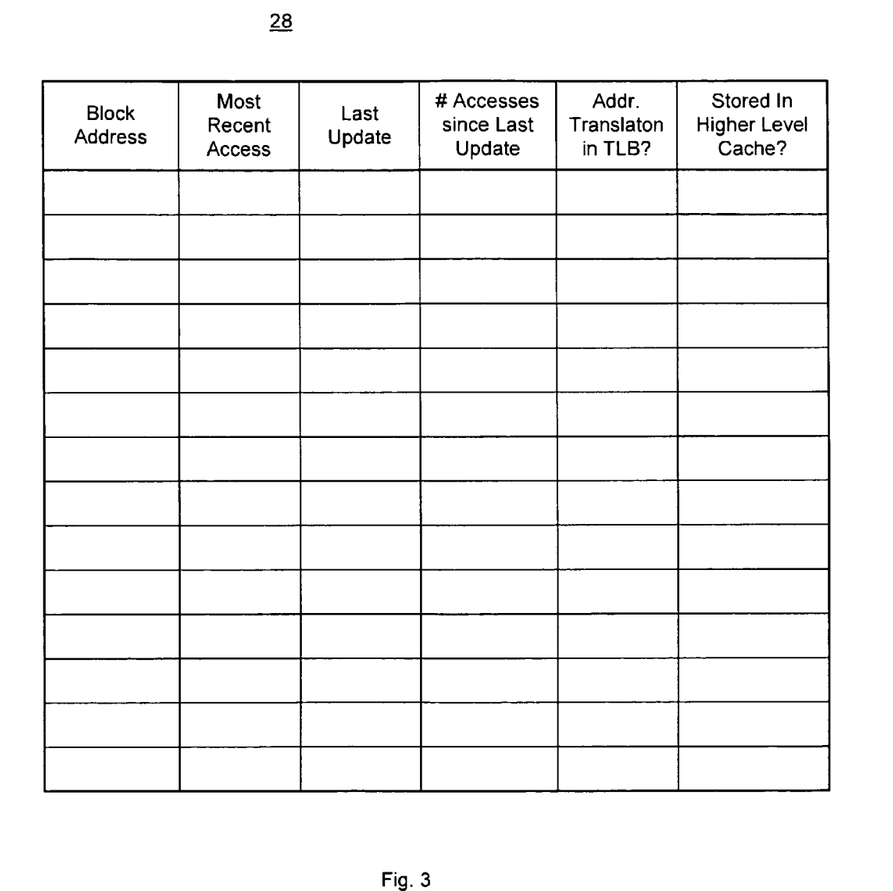
FIG. 3 is a drawing of one embodiment of a history table.

An exemplary embodiment of a history table is shown in FIG. 3. The embodiment of history table 28 shown in FIG. 3 includes columns indicating the block address (i.e. where in the cache the block is stored), the most recent access, the last update to the block, the number of accesses to the last update, an indication of whether corresponding address translation information is stored in a TLB, and whether or not the block is also stored in a higher level cache. Embodiments including additional fields and/or other types of fields are possible and contemplated. Furthermore, embodiments wherein IS history table 28 is organized in a different manner are also possible and contemplated. For example, an embodiment of history table 28 is contemplated wherein entries are arranged in order of the number of accesses since the last update, or on any other ones of the parameters for which information is stored therein. Furthermore, it is also possible and contemplated wherein the organization of history table 28 may be changed during operation, depending on a particular operating environment. For example, history table 28 may be organized by block addresses when one or more of a first set of programs are executing on processor 10, and organized by number of accesses since the last update when one or more of a second set of programs are executing on processor 10.

During operation of cache subsystem 15, migration logic 27 may monitor the entries stored in cache 20 and may also update history table 28 based on any changes detected. Furthermore migration logic 27 may also access history table 28 in order to determine whether any migration of blocks between the fast ways and slow ways may be necessary. For example, if migration logic 27 determines that a block stored in a fast way has been access less recently than one or more entries store in a slow way, it may cause the less recently accessed block to be moved from a storage location in a fast way to a storage location in the slow way. Migration logic 27 may also cause the movement of a block from one of the slow ways into a fast way to replace the other block that was moved into a slow way. Migration logic 27 may also access parameter register file 29 in order to determine which parameters are to be prioritized in determining whether a given block should be stored in one of the fast ways or one of the slow ways. The monitoring of history table 28 by migration logic 27 may include the migration logic 27 periodically reading each of the entries in history table 28.

It should also be noted that in some embodiments, it may be possible to subdivide a cache between more than two subsets. For example, embodiments are possible and contemplated wherein a cache may be subdivided into a first subset of low latency (fast) ways, a second subset of medium latency ways, and a third subset of high latency (slow) ways. The various functional units of decision unit 25 may be configured to determine which ways should be placed in each of these subsets, and may consider one or more parameters when determining in which subset a given block of binary information should be stored. In general, the number of subdivisions (and thus, number of subsets) for a cache in a particular embodiment may be limited by the number of ways in the cache and the particular functionality of decision unit 25. Furthermore, within a given embodiment, it is possible that in a first operating condition, the embodiment has a first number of subsets (e.g., 2) and in a second operating condition the embodiment has a second number of subsets (e.g., 3).

Figure 4:
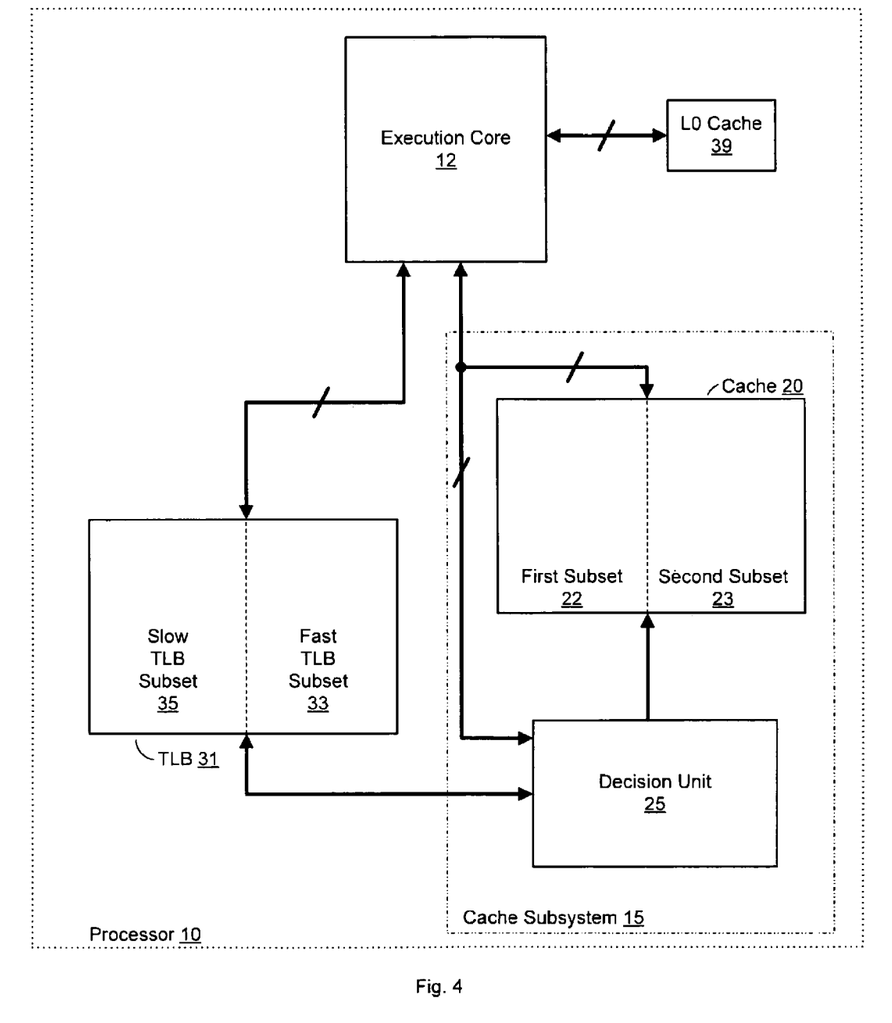
FIG. 4 is a block diagram of one embodiment of a processor including an execution core, a cache subsystem, and a translation lookaside buffer.

Turning now to FIG. 4, a block diagram of one embodiment of a processor including an execution core, a cache subsystem, and a translation lookaside buffer is shown. In the embodiment shown, processor 10 includes, in addition to execution core 12 and cache subsystem 15, a TLB 31 is also present in this embodiment. TLB 31 may be a type of cache that stores memory address translation information (e.g., page tables) for virtual-to-physical address translations. Furthermore, in the embodiment shown, TLB 31 includes a plurality of ways, which may be divided into a first subset 33 and a second subset 35. Similar to cache 20 in the embodiments discussed above, the first subset 33 may include one or more fast ways, while the second subset may include one or more slow ways. Information regarding particular address translations stored in TLB 31 may by utilized by decision unit 25 in determining where to store a block of information in cache 20.

In one embodiment, decision unit 25 may determine, for a given block of binary information, whether or not associated translation information is stored in TLB 31. If such corresponding address translation information is stored in TLB 31, decision unit 25 may further determine whether the address translation information is stored in one of the fast ways or the slow ways. If it is determined that address translation information corresponding to a given block of binary information is stored in one of the fast ways of TLB 31, decision unit 15 may assign the block to be stored in one of the fast ways of cache 20. Similarly, if it is determined that particular address translation information is stored in one of the slow ways of TLB 31, decision unit 25 may assign the associated block to be stored in one of the slow ways of cache 20. Decision unit 25 may also cause the migration of a block between the fast ways and the slow ways if a similar migration is detected for address translation information associated with the block. In some embodiments, a storage location of associated address translation information in TLB 31 may be one of a number of parameters on which a decision is made with regard to a storage location for an associated block of binary information in cache 20. Thus, it is possible in some situations that a block of binary information is stored in a fast way of cache 20 while associated address translation information is stored in a slow way of TLB 31, and vice versa.

In the embodiment shown, decision unit 25 may also be configured to determine whether address translation information is to be stored in TLB 31 based on the same or similar parameters as discussed above for cache 20. Similarly, decision unit 25 may also be configured to cause the migration of address translation information between the slow ways and the fast ways. However, embodiments are also possible and contemplated wherein TLB 31 is associated with its own corresponding decision unit, and wherein decisions of where to store address translation information may be made independently of similar decisions made for storing information in cache 20.

Processor 10 also includes an L0 cache 39 in the embodiment shown. The L0 (level 0) cache 39 in the embodiment shown may be a higher-level cache than cache 20 (which may be an L1 cache). When a block of binary information is to be stored in cache 20, decision unit 25 may also determine whether or not the same block is stored in L0 cache 39. If so, decision unit 25 may assign the block of binary information to be stored in one of the slow ways (second subset 23 in this embodiment), since the same logic block is cached in a higher-level cache. During execution of instructions, if a given block of information is needed, execution core 12 may first query L0 cache 39 for the block. Thus, when a block is stored in L0 cache 39, the block may be stored in one of the slow ways of cache 20, since that block may be accessed by execution core 12 from L0 cache 39. However, if the block is purged from L0 cache 39, decision unit 25 (e.g., via migration unit 27 as discussed above) may cause the block to be migrated to one of the fast ways if it has sufficiently high priority, as indicated by one or more parameters associated therewith.

Similar techniques may be applied to lower level caches as well. For example, if an L2 (level two) cache is implemented in a cache subsystem similar to cache subsystem 15, a corresponding decision unit may determine that a block of binary information may be stored in one of its slow ways if that same block is also stored in an L1 cache. Similarly, a decision unit associated with an L3 cache could base a decision as to whether a block will be stored in a fast way or a slow way on whether or not that block is also stored in an L2 cache.

It should also be noted that while decision unit 25 and the various functions it provides has been discussed in terms of hardware, it is also possible and contemplated that some or all of the functionality of decision unit 25 may be implemented in software. For example, in one embodiment, an operating system may include one or more modules that perform functions similar to those provided by decision unit 25 as discussed above. Accordingly, the various methods of operation described herein are not limited to hardware implementations.

Figure 5:
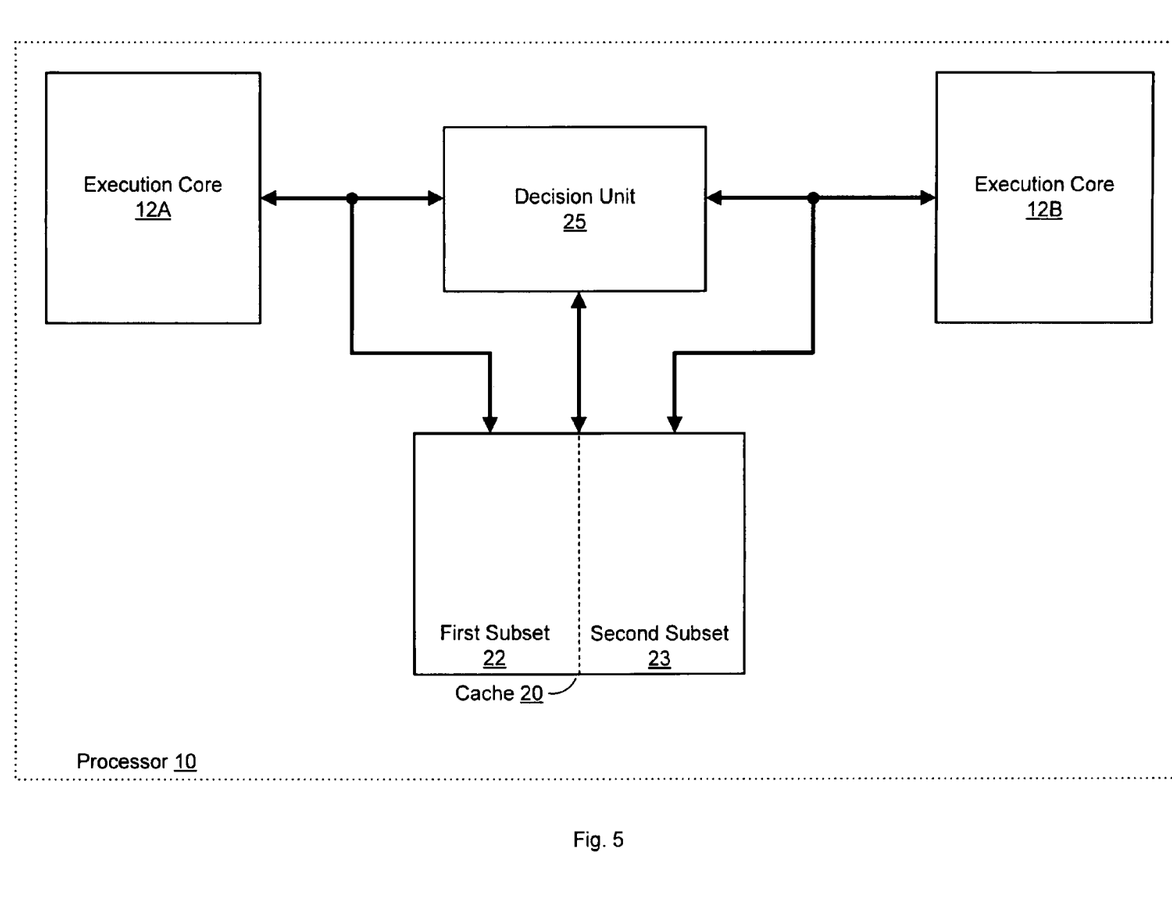
FIG. 5 is a block diagram of one embodiment of a multi-core processor.

FIG. 5 is a block diagram of one embodiment of a multi-core processor. In this particular embodiment, execution cores 12A and 12B are a cache 20, and also to a decision unit 25. Due to physical proximity, the first subset (of ways) 22 of cache 20 may be designated as fast ways for execution core 12A, while the second subset (of ways) 23 may be designated as slow ways for execution core 12A. However, since the second subset 23 is closer to execution core 12B than the first subset 22, second subset 23 may be designated as the fast ways for execution core 12B, while first subset 22 may be designated as the slow ways for execution core 12B. Accordingly, when a given one of execution cores 12A and 12B provides a block of information to be stored into cache 20, decision unit 25 may also factor in this arrangement in determining where the block will be stored.

Decision unit 25 may also be configured to handle conflicts that may arise between the two execution cores when determining where blocks of binary information are to be stored. Consider an example for the embodiment shown wherein a low priority block provided by execution unit 12A to be stored in second subset 23 conflicts with a high priority block to provided by execution unit 12B to also be stored second subset 23. In making a determination as to which block will be stored in a way of second subset 23, decision unit 25 may determine the relative priorities of the execution threads associated with the blocks of data. Thus, if a thread executing on execution core 12A and associated with a first block has higher priority than a thread associated with a second, conflicting block executing on execution core 12B, decision unit 25 may prioritize the storage of the first block. Other parameters (e.g., associated instruction type, address translations stored in a TLB, higher level cache storage) may also be considered in making such a decision.

It may also be possible in some embodiments to divide cache 20 into three subsets of ways, wherein a first subset acts as a subset of fast ways for execution core 12A, a second subset acts as a subset of fast ways for execution core 12B, and a third subset acts as a shared subset of slow ways for both execution cores 12A and 12B. Such an embodiment may be useful for preventing conflicts between high priority blocks of binary information.

Figure 6:
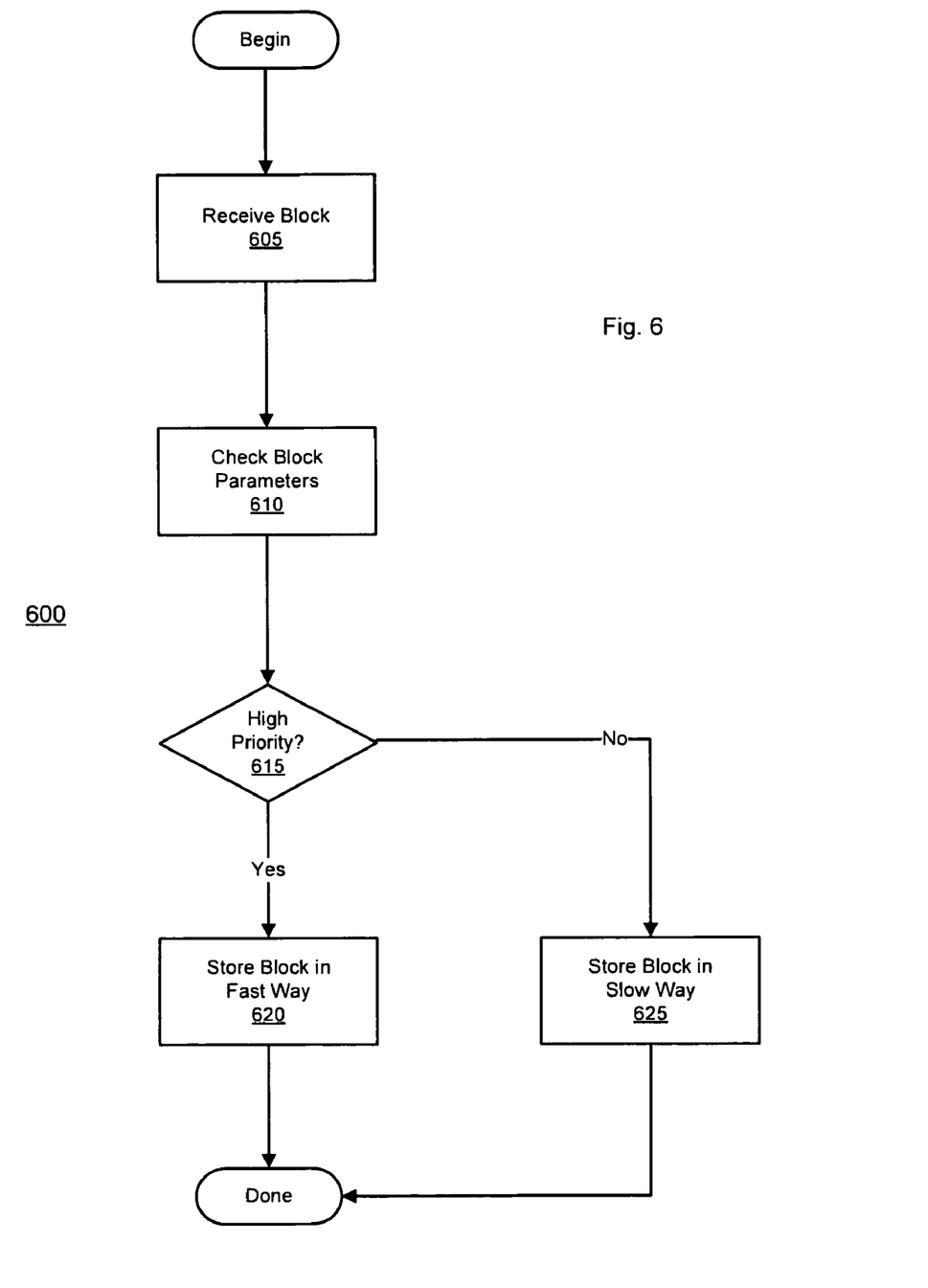
FIG. 6 is a flow diagram of one embodiment of a method for determining where in a cache to store a block of binary information.

Turning now to FIG. 6, a flow diagram of one embodiment of a method for determining where in a cache to store a block of binary information is shown. Method 600 begins with the receiving of a block of binary information (item 605). The block of binary information may be provided from an execution core to a decision unit associated with a cache memory, as in one of the various embodiments discussed above. In addition to the block of binary information, parameter information associated with the block of data may also be provided. The parameter information may include (but is not limited to), information identifying a corresponding execution thread, information associating the block of data with a virtual address (and thus virtual-to-physical address translation information), information indicating whether the block is also store (or to be stored) in a higher level cache, and so on.

After receiving the block of binary information and the associated parameter information, the parameters of the block may be checked (item 610). More particularly, the parameters may be checked in order to determine whether or not the block of binary information has sufficient priority such that it should be stored in one of a number of fast ways instead of one of a number of slow ways. Blocks to be stored in a fast way may be considered of sufficient importance that a desired latency for accesses thereto should be observed. For example, if accesses to a fast way can be made in X cycles or less, while accesses to a slow way can be made in X+1 cycles, it may be necessary that a given block be accessed in X cycles or fewer in order to meet system performance requirements. Accordingly, the parameters associated with the block may be checked to determine whether or not they indicate that the block has sufficient priority such that it should be stored in a fast way in order to meet system performance requirements. On the other hand, if it is determined that the block need not be accessed from the cache in X cycles or fewer, it may be determined that the block may be stored in a slow way.

Thus, based on a check of the parameters associated with the block and the desired latency, a determination may be made as to whether block has sufficient priority to be stored in a fast way (item 615). If it is determined that the block has sufficient priority (615, yes), then the block may be stored in one of the fast ways (620). Otherwise, if the block does not have sufficient priority, or otherwise may be stored in a slow way without adversely affecting system performance goals, then the block may be stored in one of the slow ways (625).

Figure 7:
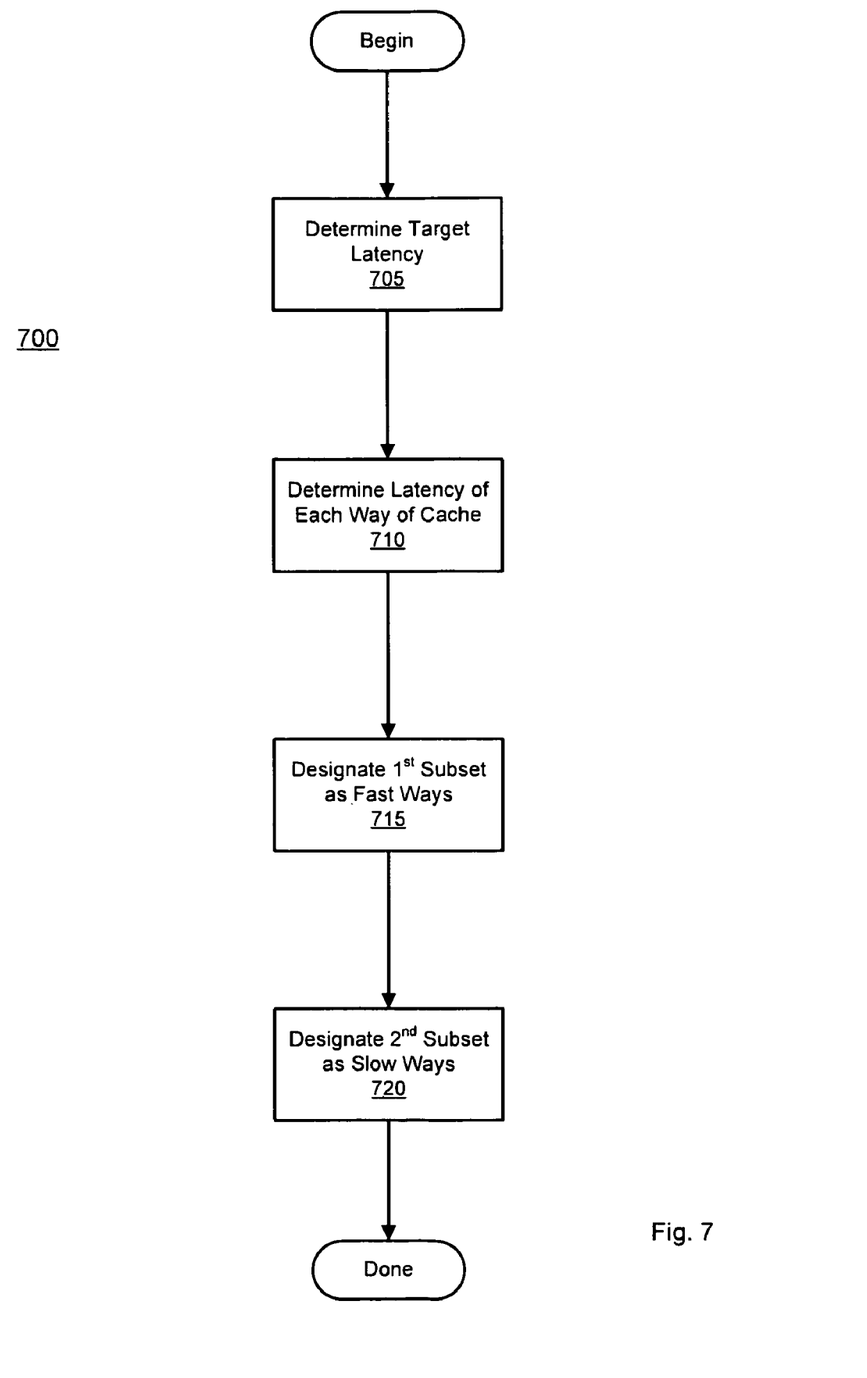
FIG. 7 is a flow diagram of one embodiment of a method for determining a first set of fast ways and a second set of slow ways in a cache.

FIG. 7 is a flow diagram of one embodiment of a method for determining a first set of fast ways and a second set of slow ways in a cache. In the embodiment shown, method 700 begins with the determination of a target latency (item 705). The target latency may be that latency which is desired for accesses to blocks of data stored in a cache, wherein the accesses are important for achieving and maintaining system performance goals. For example, it may be desirable that accesses to important blocks of binary information stored in a cache have a latency that is X cycles or less, while the average latency for an access to the cache is X+0.5 cycles.

After determining the target latency, a number of cache accesses may be performed, including at least one access to each way of the cache (item 710). For each of the access, the latency associated therewith may be recorded. Those ways for which accesses have a latency that is less than or equal to the target latency (e.g., X cycles or less) may be designated to be part of a first subset of fast ways (item 715). Those ways for which the latency of access exceeds the target latency (e.g., greater than X cycles) may be designated as a second subset of slow ways (item 720). For subsequent accesses to the cache, a determination may be made as to whether to store a given block of information in a fast way or a slow way, in accordance with the various methods and functional circuitry as discussed above.

It is also noted that the method discussed with reference to FIG. 7 may be modified to determine more than two subsets of ways. For example, a method is contemplated wherein a first subset of low latency ways, a second subset of medium latency ways, and a third subset of high latency ways are designated based on at least two target latency values.

In general, the various embodiments discussed herein may result in a processor having a cache subsystem wherein determinations of where to store blocks of binary information may be made based on one or more target latency requirements and one or more parameters associated with each block of data. Higher priority blocks of data may be stored in ways of a cache that have a lower access latency (i.e. faster accesses), while blocks of data that are of a lower priority may be stored in ways of a cache that have a higher access latency (i.e. slower accesses). This may tend to reduce the average latency of cache accesses, and may thus aid in meeting processor performance goals, particularly if more frequently access blocks of information are stored in fast ways While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising:
receiving a block of binary information to be stored in a cache memory having a plurality of ways, wherein the plurality of ways includes a first subset of ways and a second subset of ways, wherein a cache access by a first execution core to one of the first subset of ways has a lower latency time than a cache access to one of the second subset of ways;
determining, based on a predetermined access latency and one or more parameters associated with the block of binary information, whether to store the block of binary information into one of the first set of ways or one of the second set of ways; and
storing the block of binary information into one of the first set of ways or one of the second set of ways based on results of said determining.

2. The method as recited in claim 1, wherein the method further comprises monitoring blocks of information stored in each of the first set of ways and the second set of ways, and moving one or more blocks of binary information from one of the first and second set of ways to the other one of the first and second set of ways based on one or more parameters associated with the blocks of binary information.

3. The method as recited in claim 2, wherein said monitoring comprises monitoring a history table, wherein the history table includes historical information for accesses to each of the blocks of binary information stored in the cache.

4. The method as recited in claim 3, further comprising moving at least one block of binary information from one of the second set of ways to one the first set of ways based on information stored in the history table, and further comprising moving at least one block of binary information from one of the first set of ways to one of the second set of ways based on information stored in the history table.

5. The method as recited in claim 1, further comprising accessing the cache from a second execution core, wherein the first execution core is in closer proximity to the first set of ways, wherein the second execution core is in closer proximity to the second set of ways, and wherein a cache access by the second execution core from one of the second subset of ways has a lower latency time than a cache access by the second execution core from one of the first subset of ways.

6. The method as recited in claim 1, wherein the one or more parameters include an instruction type associated with the block of binary information.

7. The method as recited in claim 1, wherein the one or more parameters include a determination of whether the block of binary information is also stored in a higher-level cache.

8. The method as recited in claim 1, wherein the one or more parameters include a thread of execution associated with the block of binary information.

9. The method as recited in claim 1, further comprising reading a register to determine which of the one or more parameters are to be used in determining, whether to store the block of binary information into one of the first set of ways or one of the second set of ways.

10. The method as recited in claim 1, further comprising:
determining whether address translation information associated with the block of binary information is stored in a translation lookaside buffer (TLB), wherein the TLB includes a plurality of ways including a third subset of ways and a fourth subset of ways, wherein an access to one of the third subset of ways has a lower latency time than a cache access to one of the fourth subset of ways;
determining, if the address translation information is stored in the TLB, whether the address translation information is stored in one of the third subset of ways or the fourth subset of ways;
storing the block of binary information in one of the first subset of ways if the address translation information is stored in one of the third subset of ways; and
storing the block of binary information in one of the second subset of ways if the address translation information is stored in one of the fourth subset of ways.

11. A processor comprising:
a first execution core;
a cache memory having a plurality of ways, wherein the plurality of ways includes a first subset of ways and a second subset of ways, wherein a cache access by the first execution core to one of the first subset of ways has a lower latency time than a cache access by the execution core to one of the second subset of ways; and
a decision unit configured to, for a given block of binary information to be stored in the cache, determine whether the block of binary information is to be stored in a way of the first subset or a way of the second subset based on a predetermined access latency and one or more parameters associated with the block of binary information.

12. The processor as recited in claim 11, wherein the decision unit is configured to monitor blocks of binary information stored in each of the first set of ways and the second set of ways, and wherein the decision unit is configured to move one or more blocks of binary information from one of the first and second set of ways to the other one of the first and second set of ways based on one or more parameters associated with the blocks of binary information.

13. The processor as recited in claim 12, wherein the decision unit is configured to monitor a history table, wherein the history table includes historical information for accesses to each of the blocks of binary information stored in the cache.

14. The processor as recited in claim 11 wherein the processor further comprises a second execution core, wherein the first execution core is in closer physical proximity to the first set of ways, wherein the second execution core is in closer physical proximity to the second set of ways, wherein a cache access by the second execution core from one of the second subset of ways has a lower latency time than a cache access by the second execution core from one of the first subset of ways.

16. The processor as recited in claim 11, wherein the decision unit includes an arbitration unit configured to determine whether the block of binary information is to be stored in a way of the first subset or the second subset; and
a parameter register file configured to store parameter information, wherein the arbitration unit is configured to access the parameter information in order to determine whether the block of binary information is to be stored in a way of the first subset or the second subset.

16. The processor as recited in claim 11, wherein the one or more parameters include one or more of the following:
an instruction type associated with the block of binary information;
a determination of whether the block of binary information is also stored in a higher level cache;
a thread of execution associated with the block of binary information.

17. The processor as recited in claim 11, wherein the processor further includes a translation lookaside buffer (TLB) configured to store address translation information, wherein the TLB includes a plurality of ways including a third subset of ways and a fourth subset of ways, wherein an access to one of the third subset of ways has a lower latency time than a cache access to one of the fourth subset of ways;
wherein the decision unit is further configured to:
determine whether address translation information associated with the block of binary information;
determine, if the address translation information is stored in the TLB, whether the address translation information is stored in one of the third subset of ways or the fourth subset of ways;
store the block of binary information in one of the first subset of ways if the address translation information is stored in one of the third subset of ways; and
store the block of binary information in one of the second subset of ways if the address translation information is stored in one of the fourth subset of ways.

18. A method comprising:
determining a target latency for accesses to a cache memory, the cache memory having a plurality of ways;
determining a first set of ways, wherein latency for accesses from one of the first set of ways is less than or equal to the target latency;
determining a second set of ways, wherein latency for accesses from one of the second set of ways is greater than the target latency;
designating the first set of ways as fast ways;
designating the second set of ways as slow ways;
for subsequent writes to the cache memory, determining whether a block of binary information is to be stored in one of the fast ways or one of the slow ways based on one or more parameters associated with the block of binary information.

19. The method as recited in claim 18, further comprising storing, in a register file:
information indicating which of the plurality of ways comprise the first set of ways and which of the plurality of ways comprise the second set of ways; and
indications of which of the one or more parameters are to be used in determining, whether to store the block of binary information into one of the first set of ways or one of the second set of ways.

20. The method as recited in claim 18, wherein the one or more parameters include one or more of the following:
an instruction type associated with the block of binary information;
a determination of whether the block of binary information is also stored in a higher level cache;
a thread of execution associated with the block of binary information.

* * * * *